US008515881B2

(12) United States Patent
Schwoegler et al.

(10) Patent No.: US 8,515,881 B2
(45) Date of Patent: Aug. 20, 2013

(54) MULTIPLE HYPOTHESIS TRACKING

(75) Inventors: Stefan J. Schwoegler, Redondo Beach, CA (US); Samuel S. Blackman, Los Angeles, CA (US); Rachel B. Norman, Long Beach, CA (US); Douglas E. Carroll, Downey, CA (US); Stephen A. Capparelli, Torrance, CA (US)

(73) Assignee: Raytheon Company, Waltham, MA (US)

( * ) Notice: Subject to any disclaimer, the term of this patent is extended or adjusted under 35 U.S.C. 154(b) by 369 days.

(21) Appl. No.: 13/045,803

(22) Filed: Mar. 11, 2011

(65) Prior Publication Data

US 2012/0233097 A1    Sep. 13, 2012

(51) Int. Cl.
   *G06F 15/18*    (2006.01)
   *G06N 99/00*    (2010.01)

(52) U.S. Cl.
   CPC .................................. *G06N 99/005* (2013.01)
   USPC ......................................................... 706/12

(58) Field of Classification Search
   None
   See application file for complete search history.

(56) References Cited

U.S. PATENT DOCUMENTS

| | | | |
|---|---|---|---|
| 5,414,643 A | | 5/1995 | Blackman et al. |
| 5,765,166 A | | 6/1998 | Gotfried et al. |
| 5,798,942 A | * | 8/1998 | Danchick et al. ............... 342/96 |
| 5,893,097 A | | 4/1999 | Hayata et al. |
| 5,909,189 A | | 6/1999 | Blackman et al. |
| 6,239,739 B1 | | 5/2001 | Thomson et al. |
| 7,003,509 B2 | | 2/2006 | Andreev |
| 7,081,849 B2 | | 7/2006 | Collins et al. |
| 7,256,729 B2 | * | 8/2007 | Bummerstede ................. 342/59 |
| 7,895,649 B1 | | 2/2011 | Brook et al. |
| 2008/0288434 A1 | * | 11/2008 | De ................................... 706/47 |
| 2009/0199265 A1 | | 8/2009 | Hudis et al. |

OTHER PUBLICATIONS

Tsai, Flora S. et al.; "Detecting Cyber Security Threats in Weblogs Using Probabilistic Models"; 2007; Springer-Verlag; PAISI 2007, LNCS 4430; pp. 46-57.*
Blackman et al.; "Design and Analysis of Modern Tracking Systems"; Publisher: Artech House, Dedham, MA [ISBN 1-58053-006-0]; 29 Pages [Excerpt] (1999).
Blackman; "Multiple-Target Tracking with Radar Applications"; Publisher: Artech House, Dedham, MA; 58 Pages [Excerpt] (1986).
Gerken et al.; "Situation Awareness using Heterogeneous Models"; IEEE 2010 International Symposium on Collaborative Technologies and Systems [Piscataway, NJ, USA]; pp. 563-572; [XP031685182] (2010).
Holsopple et al.; "TANDI: Threat Assessment of Network Data and Information"; Proceedings of SPIE—Defense and Security Symposium; 6242:114-129 (2006).
Holsopple et al.; "FuSIA: Future Situation and Impact Awareness"; Proceedings of the 11th ISIF/IEEE International Conference on Information Fusion [Cologne, Germany]; 8 Pages (2008).

(Continued)

*Primary Examiner* — Jeffrey A Gaffin
*Assistant Examiner* — Stanley K Hill
(74) *Attorney, Agent, or Firm* — Pierce Atwood LLP; Joseph M. Maraia

(57) ABSTRACT

Embodiments described herein are directed to multiple hypothesis systems and methods for tracking observations that are domain agnostic and involves determining the probability that a given set of observations (i.e., a track) corresponds to a particular target, object or linked set of events. One embodiment described herein relates to cyber security tracking methods and systems.

17 Claims, 15 Drawing Sheets

(56) References Cited

OTHER PUBLICATIONS

Levchuk et al.; "Recognition of Coordinated Adversarial Behaviors from Multi-Source Information"; Proc. of SPIE, Bellingham, WA; vol. 6943: 16 Pages [XP040436826] (2008).

Pravia et al.; "Generation of a Fundamental Data Set for Hard/Soft Information Fusion"; IEEE 2008 11th International Conference on Information Fusion [Piscataway, NJ, USA]; 8 Pages; [XP031931834] (2008).

Salerno et al.; "A Situation Awareness Model Applied to Multiple Domains"; Proceedings of SPIE—Defense and Security Conference [Orlando, FL]; vol. 5813; pp. 65-74 (2005).

Salerno et al.; "Evaluating Algorithmic Techniques in Supporting Situation Awareness"; Proc. of SPIE—Defense and Security Conference [Orlando, FL]; vol. 5813; pp. 96-104 (2005).

Sittler; "An Optimal Data Association Problem in Surveillance Theory"; IEEE Trans. On Military Electronics; vol. MIL-8:125-139 (1964).

Solano; "SoSE Architecture Principles for Net-Centric Multi-Int Fusion Systems"; Pro. of the 2011 6th International Conference on System of Systems Engineering; pp. 61-66 [XP031907833] (2011).

Stotz et al.; "Information Fusion Engine for Real-time Decision-making (INFERD): A Perceptual System for Cyber Attack Tracking"; Information Fusion—IEEE 10th International Conference; 8 Pages (2007).

Tadda et al.; "Realizing Situation Awareness in a Cyber Environment"; Proc. of SPIE—Defense and Security Symposium [Orlando, FL]; vol. 6242; 8 Pages (2006).

Samuel S. Blackman; Multiple Hypothesis Tracking for Multiple Target Tracking; IEEE A&E Systems Magazine; vol. 19, No. 1; pp. 5-18; Jan. 2004.

John Divers; Possible Worlds; The Problems of Philosophy; Routledge; Chapter 1; pp. 3-40; 2002.

* cited by examiner

MULTIPLE HYPOTHESIS TRACKING

FIELD OF THE INVENTION

The currently described invention relates to multiple hypothesis systems and methods for tracking observations.

BACKGROUND

Prior art methods for multiple hypothesis tracking have been implemented in radar tracking systems. Consecutive radar observations of the same target are grouped in tracks. The multiple hypothesis tracking methods allow a track to be updated by more than one observation for each radar update cycle. This produces multiple possible tracks. As each radar update cycle is received every possible track can be potentially updated. The tracks branch into many possible directions. The multiple hypothesis tracking methods calculate the probability of each potential track and typically only report the most probable of all the tracks. Existing methods are limited to use in specific domains that prevent them from being used in alternative domains or across multiple types of domains.

A need therefore exists for improved multiple hypothesis systems and methods for tracking observations.

SUMMARY

Embodiments described herein are directed to multiple hypothesis systems and methods for tracking observations that are domain agnostic. One embodiment described herein relates to cyber security tracking methods and systems.

One embodiment is a multiple hypothesis tracking method for tracking observations. The method includes receiving observations associated with data signals from a plurality of domain types and distributing each of the observations to one or more association engines, wherein each association engine is configured for a particular domain type and each association engine manages zero or more preexisting tracks of observations. The method also includes associating each of the observations with a) the one or more preexisting tracks, or b) a newly generated track to generate an updated set of tracks. The method also includes sending the updated set of tracks with track quality scores for each track to a domain agnostic hypothesis manager. The method also includes updating a track hypothesis model of the domain agnostic hypothesis manager with the updated set of tracks. The method also includes determining a probability estimate for each track in the track hypothesis model and selecting a hypothesis for each cluster of related tracks stored in the track hypothesis model that satisfies a predetermined cluster condition. The method also includes sending the probability estimate for each track in the track hypothesis model and the selected hypothesis for each cluster of tracks to the one or more association engines to update track information in the one or more association engines. The method also includes sending the updated track information with domain specific information to an entity collector module for distribution to a recipient processor.

In some embodiments, the method includes selecting a subset of the tracks from the tracks in the selected hypothesis in the domain agnostic hypothesis manager that satisfy a predetermined criterion. In some embodiments, selecting the subset of the tracks from the tracks in the domain agnostic hypothesis manager comprises selecting tracks from the hypothesis having the highest probability estimate based on observations from a plurality of domain types.

In some embodiments, the track hypothesis model does not include track state data that includes domain specific data. In some embodiments, the association engines are not required to include track cluster information. In some embodiments, updating the track hypothesis model comprises updating stored probability estimates and removing tracks that are inconsistent with the selected hypothesis for each cluster of tracks.

In some embodiments, updating track information in the one or more association engines comprises updating stored probability estimates and removing tracks that do not satisfy a predetermined criterion. In some embodiments, a message handling system communicates messages between the domain agnostic hypothesis manager and the one or more association engines in the absence of domain specific data.

Another embodiment is a multiple hypothesis tracking system for tracking observations. The system includes an observation distributor module configured to receive observations associated with data signals from a plurality of domain types. The system also includes one or more association engines each configured for a particular domain type and each comprising zero or more preexisting tracks of observations stored in a data storage device, wherein each of the one or more association engines is configured to receive each of the observations from the observation distributor module and configured to associate each of the observations with a) the one or more preexisting tracks of observations, or b) one or more newly generated tracks to generate an updated set of tracks with track quality scores for each track. The system also includes a domain agnostic hypothesis manager for, via a processor, receiving the updated set of tracks, updating a track hypothesis model of the domain agnostic hypothesis manager with the updated set of tracks, determining a probability estimate for each track in the track hypothesis model, selecting a hypothesis for each cluster of related tracks stored in the track hypothesis model that satisfies a predetermined cluster condition, and sending the probability estimate for each track in the track hypothesis model and the selected hypothesis for each cluster of tracks to the one or more association engines to update track information in the one or more association engines.

In some embodiments, the system includes an entity collector module configured to receive the updated track information with domain specific information for distribution to a recipient processor. In some embodiments, the system includes a message handling system configured to communicate messages between the domain agnostic hypothesis manager and the one or more association engines in the absence of domain specific data.

In some embodiments, the processor selects a subset of the tracks from the tracks in the domain agnostic hypothesis manager that satisfy a predetermined criterion. In some embodiments, selecting the subset of the tracks from the tracks in the domain agnostic hypothesis manager comprises the processor selecting tracks from the hypothesis having the highest probability estimate based on observations from a plurality of domain types. In some embodiments, the track hypothesis model does not include track state data that includes domain specific data. In some embodiments, the system includes the one or more association engines are not required to include track cluster information. In some embodiments, the system includes the domain agnostic hypothesis manager is configured to update the track hypothesis model, update stored probability estimates and remove tracks that are inconsistent with the selected hypothesis for each cluster of tracks. In some embodiments, the system includes the one or more association engines are configured to update stored probability estimates and remove tracks that do not satisfy a predetermined criterion.

Another embodiment is a multiple hypothesis cyber security tracking method for tracking observations. The method includes receiving observations associated with cyber sensor data signals from a plurality of cyber-domain types and distributing each of the observations to one or more association engines, wherein each association engine is configured for a particular domain type and each association engine manages zero or more preexisting tracks of observations. The method also includes associating each of the observations with a) the one or more preexisting tracks, or b) a newly generated track to generate an updated set of tracks. The method also includes sending the updated set of tracks with track quality scores for each track to a domain agnostic hypothesis manager and updating a track hypothesis model of the domain agnostic hypothesis manager with the updated set of tracks. The method also includes determining a probability estimate for each track in the track hypothesis model and selecting a hypothesis for each cluster of related tracks stored in the track hypothesis model that satisfies a predetermined cluster condition. The method also includes sending the probability estimate for each track in the track hypothesis model and the selected hypothesis for each cluster of tracks to the one or more association engines to update track information in the one or more association engines and sending the updated track information with cyber-domain specific information to an entity collector module for distribution to a recipient processor.

In some embodiments, associating each of the observations comprises associating a new observation with the observations of a first preexisting track if the new observation satisfies a predetermined criterion. In some embodiments, the predetermined criterion is a criterion based on one or more of a) the new observation's source IP address, b) the new observation's destination IP address, or c) measured CPU utilization. In some embodiments, associating each of the observations comprises associating a new observation with the observations of a first preexisting track if the new observation correlates to the first preexisting track and the new observation IP address matches the IP address of each of the observations in the first preexisting track.

In some embodiments, associating each of the observations comprises creating a new track if a new observation correlates to a first preexisting track but the new observation does not satisfy a predetermined criterion. In some embodiments, the predetermined criterion is not satisfied if the new observation IP address does not match IP addresses of each of the observations in the first preexisting track.

In some embodiments, the method includes selecting a subset of the tracks from the tracks in the selected hypothesis in the domain agnostic hypothesis manager that satisfies a predetermined criterion. In some embodiments, selecting the subset of the tracks from the tracks in the domain agnostic hypothesis manager comprises selecting tracks from the hypothesis having the highest probability estimate based on observations from a plurality of domain types. In some embodiments, the track hypothesis model does not include track state data that includes cyber-domain specific data.

In some embodiments, the one or more association engines are not required to include track cluster information. In some embodiments, updating the track hypothesis model comprises updating stored probability estimates and removing tracks that are inconsistent with the selected hypothesis for each cluster of tracks. In some embodiments, updating track information in the one or more association engines comprises updating stored probability estimates and removing tracks that do not include probabilities that satisfy a predetermined criterion based on the updated track hypothesis model. In some embodiments, a message handling system communicates messages between the domain agnostic hypothesis manager and the one or more association engines in the absence of cyber-domain specific data.

Another embodiment is a multiple hypothesis cyber security tracking system for tracking observations. The system includes an observation distributor module configured to receive observations associated with cyber sensor data signals from a plurality of cyber-domain types. The system also includes one or more association engines each configured for a particular cyber domain type and each comprising zero or more preexisting tracks of observations stored in a data storage device, wherein each of the one or more association engines is configured to receive each of the observations from the observation distributor module and configured to associate each of the observations with a) the one or more preexisting tracks of observations, or b) one or more newly generated tracks to generate an updated set of tracks with track quality scores for each track. The system also includes a domain agnostic hypothesis manager for, via a processor, receiving the updated set of tracks, updating a track hypothesis model of the domain agnostic hypothesis manager with the updated set of tracks, determining a probability estimate for each track in the track hypothesis model, selecting a hypothesis for each cluster of related tracks stored in the track hypothesis model that satisfies a predetermined cluster condition, and sending the probability estimate for each track in the track hypothesis model and the selected hypothesis for each cluster of tracks to the one or more association engines to update track information in the one or more association engines.

In some embodiments, associating each of the observations comprises associating a new observation with the observations of a first preexisting track if the new observation correlates to the first preexisting track and the new observation IP address matches the IP address of each of the observations in the first preexisting track. In some embodiments, associating each of the observations comprises creating a new track if a new observation correlates to a first preexisting track but the new observation IP address does not match IP addresses of each of the observations in the first preexisting track.

In some embodiments, the system includes an entity collector module configured to receive the updated track information with cyber-domain specific information for distribution to a recipient processor. In some embodiments, the system includes a message handling system configured to communicate messages between the domain agnostic hypothesis manager and the one or more association engines in the absence of cyber-domain specific data.

In some embodiments, the processor selects a subset of the tracks from the tracks in the domain agnostic hypothesis manager that satisfy a predetermined criterion. In some embodiments, selecting the subset of the tracks from the tracks in the domain agnostic hypothesis manager comprises the processor selecting tracks from the hypothesis having the highest probability estimate based on observations from a plurality of domain types.

In some embodiments, the track hypothesis model does not include track state data that includes cyber-domain specific data. In some embodiments, the one or more association engines are not required to include track cluster information. In some embodiments, the domain agnostic hypothesis manager is configured to update the track hypothesis model, update the stored probability estimates and remove tracks that are inconsistent with the selected hypothesis for each cluster of tracks. In some embodiments, the one or more association engines are configured to update the stored probability estimates and remove tracks that do not include probabilities that satisfy a predetermined criterion.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
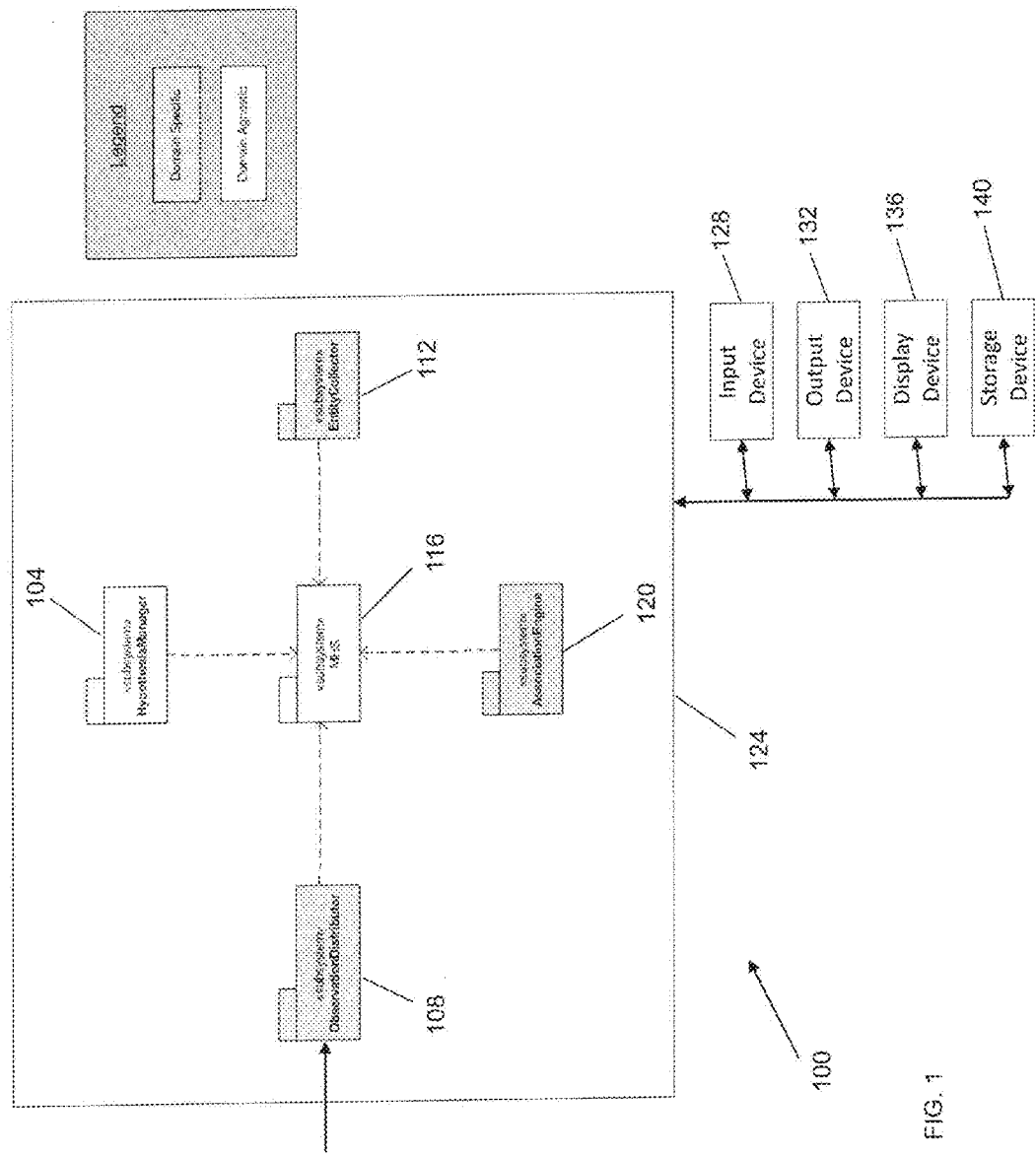
FIG. 1 is a schematic illustration of a multiple hypothesis tracking system, according to an illustrative embodiment.

FIG. 1 is a schematic illustration of a multiple hypothesis tracking system 100, according to an illustrative embodiment. Multiple hypothesis tracking involves determining the probability that a given set of observations (i.e., a track) corresponds to a particular target, object or linked set of events. The system 100 includes a domain agnostic hypothesis manager 104, observation distributor module 108, entity collector module 112, a message handling system 116, and one or more association engines 120. The message handling system (MHS) 116 acts as the broker or middleware between all other modules within the multiple hypothesis tracking system 100. Various communication protocols may be used in the MHS 116. In one embodiment, the communication protocol is based on the Java Messaging Service (JMS) specification, which allows the tracking system 100 modules to communicate between each other to create, send, receive, and read messages.

The observation distributor module 108 is an external interface adaptor configured to receive incoming data that contain one or more observations (e.g., measurements, measurement reports, observables) from a data provider (e.g., radar system, computer network system). The observation distributor module 108 is domain specific; the module 108 is configured to receive observations of a specific domain type. The observation distributor module 108 distributes the observations via messages to the one or more association engines 120 via the MHS 116. Data received by the observation distributor module 108 is passed to the one or more association engines 120, which parse the detailed information of domain-specific observation/measurements in that observation. The data received by the association engines 120 include an identifier of the sensor that produced the observations, the number of observations in the data, an initial identifier for the observations in the data, and domain-specific data for the observations. The observation distributor module 108 does need to know how many observations are in the data so the observation distributor module 108 can assign unique identifiers for observation included in the data.

The systems and methods described herein are applicable to a variety of domain and observation types. For example, in some embodiments, the observations are generated by sensors that measure physical events (e.g., radar signals, electro-optical signals, thermal signatures, sonar signals) or cyber events (e.g., cyber events, access requests).

The association engines 120 receive observation messages from the observation distributor modules via the MHS 116. The association engines 120 associate the observations with tracks, by generating one or more new tracks for the observations and/or by pairing them with one or more preexisting tracks. Tracks are a set of associated observations. The association engines 120 create a new track for each new observation when it is possible that a new observation might be a new trackable (i.e., independent) event. The association engines 120 create new tracks even if the observation also associates with an existing track. The association engines 120 also create a new track for each pairing of each observation with an existing track.

By way of example, in a cyber security embodiment, the association engines may associate a new observation with the observations of a preexisting track if the new observation satisfies a predetermined criterion (e.g., whether the new observation's source IP address, destination IP address, or measured CPU utilization satisfies the predetermined criterion). In one embodiment, the new observation correlates to (could be associated with) the preexisting track and the new observation IP source address matches the IP source address of each of the observations in the preexisting track.

Observations having different domain types are directed to association engines 120 configured to the appropriate domain type. For example, an observation tied to an IP/port address of a computer is directed to an association engine 120 configured to receive that domain type; while, an observation tied to a physical location (e.g., latitude/longitude) is directed to an association engine 120 configured to receive that domain type. If the observations used by both the association engines 120 are acquired from a measurement type that is hybrid (i.e., includes multiple domain types), the hypothesis manager 104 establish a link between the two tracks.

The association engines 120 then send the track information with track quality scores for each track to the domain agnostic hypothesis manager 104 via the MHS 116. At this stage, the information sent to the domain agnostic hypothesis manager 104 is domain agnostic. The information includes track information; however, domain specific information is not included (and not necessary) since the domain agnostic hypothesis manager 104 still may process the disparate domain-type observations together because the domain agnostic hypothesis manager 104 receives information designating how the different tracks may be linked. The track information includes a track identifier, observation identifier, track quality score, identifier of parent track with which the observation is associated (parent tracks may be associated with tracks that are originally of different domain type), and time of the observation. This information does not include domain specific information.

The track quality score is a measure of the fit between a track and an associated observation. In some embodiments, a log likelihood ratio is used for the track quality score in accordance with:

$$Q = \ln\left[\frac{P_T}{P_F}\right] \qquad \text{EQN. 1}$$

where Q is the track quality score, $P_T$ is the probability of a true target, and $P_F$ is the probability of a false alarm.

The association engines 120 then wait for results from the domain agnostic hypothesis manager 104. The results contain a list of identifiers of updated tracks, a probability estimate for each track of being a target/entity, and the hypothesis for each cluster of tracks stored in a track hypothesis model that satisfies a predetermined cluster condition. The results from the domain agnostic hypothesis manager 104 also include a list of tracks that the domain agnostic hypothesis manager 104 deleted due to its decision making processing. The association engines 120 also clean up those tracks in its data model to remain in sync with the track hypothesis module of the domain agnostic hypothesis manager 104.

Figure 2:
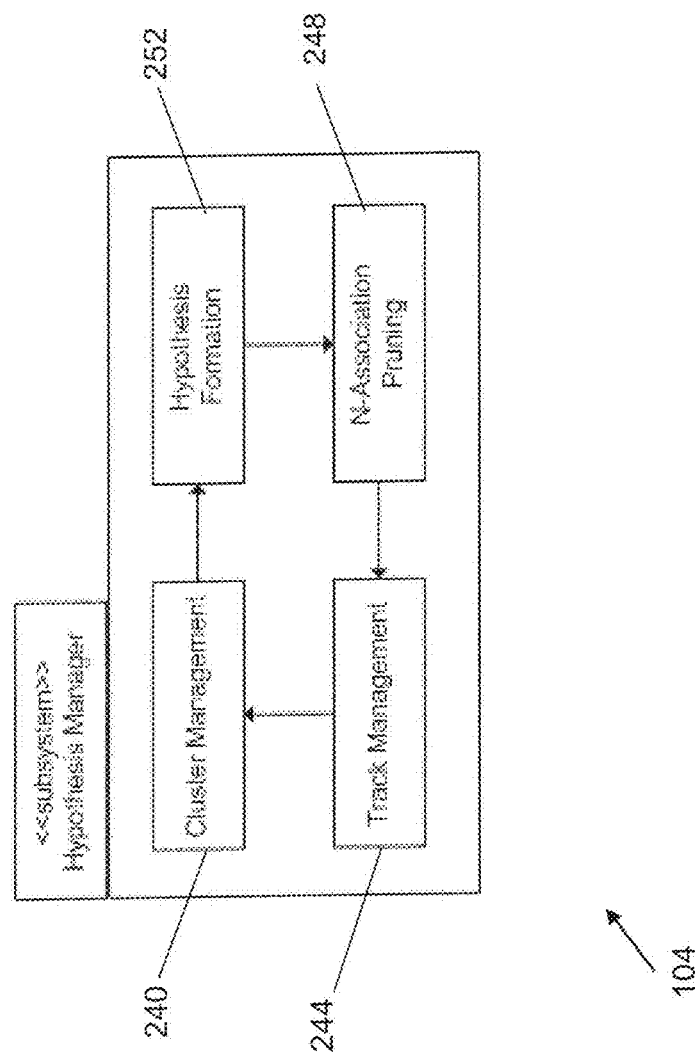
FIG. 2 is a schematic illustration of a domain agnostic hypothesis manager, according to an illustrative embodiment.

FIG. 2 is a schematic illustration of an exemplary domain agnostic hypothesis manager 104. The domain agnostic hypothesis manager 104 includes a cluster management module 240, track management module 244, N-association pruning module 248, and hypothesis formation module 252.

The domain agnostic hypothesis manager 104 updates, via the track management module 244, its track hypothesis model with the data provided by the association engines 120 which includes track association information and track quality scores. The domain agnostic hypothesis manager 104 maintains the tracks to preserve relational information between observations. The domain agnostic hypothesis manager 104 also creates and maintains incompatibilities between the tracks, and cluster information between the tracks via the cluster management module 240. As necessary, the domain agnostic hypothesis manager splits or merges clusters based on, for example, new data received from the association engines 120 in response to newly received observations.

The domain agnostic hypothesis manager 104 generates probability estimates for each track and finds the best hypothesis for each cluster of related tracks via the hypothesis formation module 252. A hypothesis is a set of compatible tracks containing all the observations in a given cluster. Tracks are defined as compatible if they do not contain the same observation. A family is a set of tracks representing one potential target/object/set of linked events. A cluster is a set of interacting families. Families interact when tracks from one or more families associate with the same observation. A cluster contains a set of families and thus all the tracks in those families. A family can only be in one cluster. The clusters may include observations from different domain types. Those tracks (e.g., a subset of tracks) from the best hypothesis that satisfy a predetermined criterion are selected and retained in the track hypothesis model.

The domain agnostic hypothesis manager 104 performs N-association pruning via the N-association pruning module 248. The domain agnostic hypothesis manager 104 then returns (via MHS 116) the results and any track deletes to be performed to the association engines 120.

Referring to FIG. 1, the association engines 120 then prune and update their tracks based on the hypothesis results data. Any tracks that are pruned are sent via a message with the MHS 116 to the domain agnostic hypothesis manager 104. The association engines 120 report updated track data to the entity collector module 112 via the MHS 116.

The entity collector module 112 is an interface adapter between the multiple hypothesis tracking system 100 and the consumer system of which it is a part (e.g., radar target tracking system, cyber security tracking system). The entity collector module 112 distributes the updated track information to a recipient processor of the consumer system for subsequent use. The consumer system is an external application that consumes the updated track data. Thus, at this level the tracks are treated as sets of data with associated IDs. A push paradigm is useful for this function as only tracks that would have been initiated/updated would be sent to the appropriate consumer. This would reduce the bandwidth consumed by track update messages. In one embodiment, the entity collector module 112 performs the following functions: 1. the association engine 120 determines that track X has been updated; 2. The association engine 120 sends a track update message to the entity collector module; 3. the entity collector module 112 receives the track update message; 4. the entity collector module 112 caches the track update message to fulfill future requests from external track update consumers; 5. the entity collector module 112 receives track state request message from an external consumer; and the entity collector module 112 sends track state message to the external consumer.

In some embodiments, the multiple hypothesis tracking system 100 is used to track aircraft and the consumer system is a weapons targeting system. In some embodiments, the multiple hypothesis tracking system 100 is used for cyber security monitoring and the consumer system is a computer network firewall system that terminates activity by a third party attempting to gain unauthorized access to a computer network.

The multiple hypothesis tracking system 100 operates on a processor 124. The multiple hypothesis tracking system 100 also includes an input device 128, output device 132, display device 136 and storage device 140. The storage device 140 can store information and/or any other data associated with the system 100. The storage device 140 can include a plurality of storage devices. The storage devices can include, for example, long-term storage (e.g., a hard drive, a tape storage device, flash memory, etc.), short-term storage (e.g., a random access memory, a graphics memory, etc.), and/or any other type of computer readable storage. The modules and devices described herein can, for example, utilize the processor 124 to execute computer executable instructions and/or include a processor to execute computer executable instructions (e.g., an encryption processing unit, a field programmable gate array processing unit, etc.). It should be understood that the system 100 can include, for example, other modules, devices, and/or processors known in the art and/or varieties of the illustrated modules, devices, and/or processors. The input device 128 receives information associated with the system 100 (e.g., instructions from a user, instructions from another computing device) from a user (not shown) and/or another computing system (not shown). The input device 128 can include, for example, a keyboard or a scanner. The output device outputs information associated with the system 100 (e.g., information to a printer (not shown), information to an audio speaker (not shown)). The display device 136 displays information associated with the system 100 (e.g., status information, configuration information). The processor 124 executes the operating system and/or any other computer executable instructions for the system 100. In some embodiments, the operating system and/or other executable instructions are executed on one or more processors.

Figure 3:
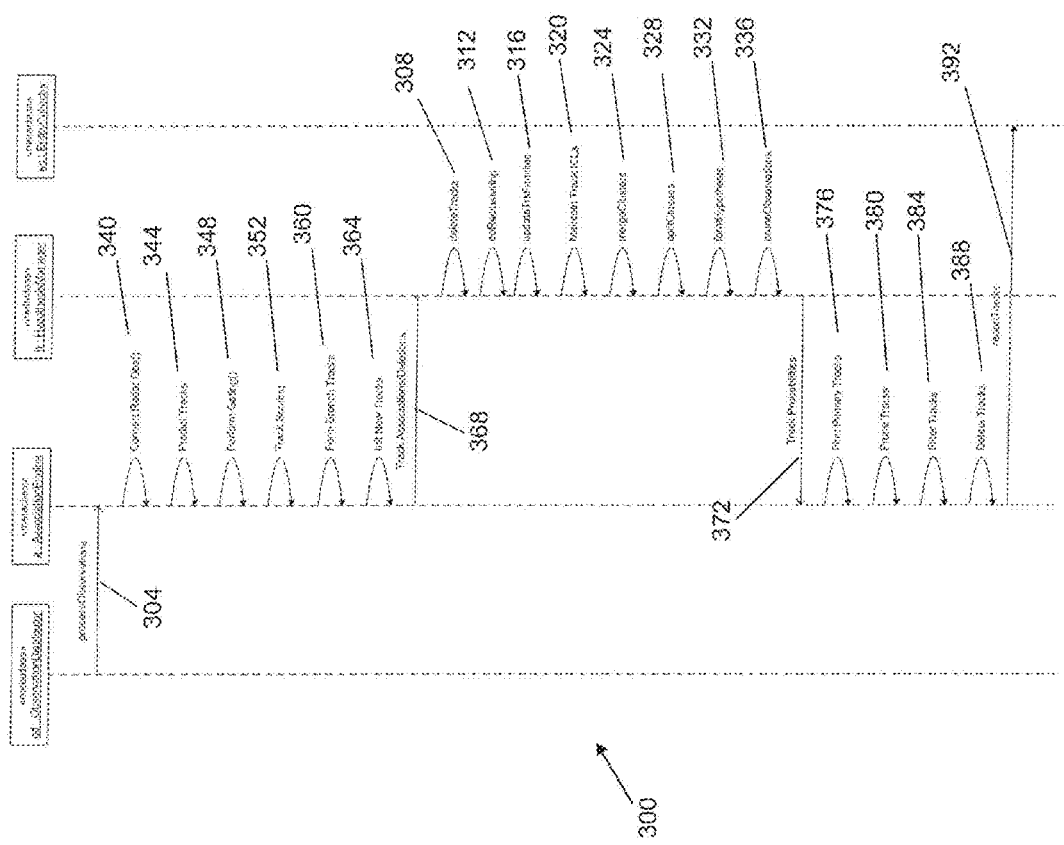
FIG. 3 is a sequence diagram showing the process steps performed by the components of a multiple hypothesis tracking system, according to an illustrative embodiment.

FIG. 3 is an example of a sequence diagram 300 showing the process steps performed by the components of a multiple hypothesis tracking system (e.g., the hypothesis tracking system 100 of FIG. 1). The multiple hypothesis tracking system includes an observation distributor module, association engine, domain agnostic hypothesis manager, and entity collector module (e.g., the observation distributor module 108, association engines 120, domain agnostic hypothesis manager 104, and entity collector module 112 of FIG. 1).

The observation distributor module processes the received observations (step 304) by receiving observation data, parsing the received data into observation messages, determining the appropriate destination association engine for each observation message (if there is more than one), and sending the observation messages to corresponding association engines. In some embodiments, there are multiple association engines. Multiple association engines may be used to, for example, allow the system to simultaneously track in more than one domain (e.g., kinematic tracking, cyber tracking) or to pursue concurrent tracking schemes to improve tracking speed.

The association engine receives the observations (e.g., radar data, cyber security data) and then converts the data (step 340) by, for example, repackaging cyber sensor specific data into the format used by MHS 116. The association engine then associates the observations with preexisting tracks and/or generates new tracks (step 344). The association engine then performs gating (step 348). Gating is the act of testing if an observation should be associated with a track. The association engine then calculates the track quality score for the tracks (step 352). The association engine then forms branch tracks (step 360) which comprises adding new child tracks to each family based on the results of gating. The association engine then initializes new tracks (step 364) to be provided to the domain agnostic hypothesis manager. The association engine then sends (step 368) the updated track information to the domain agnostic hypothesis manager via the message handling system (e.g., MHS 116 of FIG. 1).

Exemplary cyber sensors include. for example, intrusion detection systems (e.g., Snort intrusion prevention systems). Intrusion detection systems are device or software applications that monitor network and/or computer system activity to identify malicious activities or policy violations. The detection systems output reports to, a processor or display, for subsequent action by, for example, the processor or user. Exemplary cyber sensors are used to detect malicious activity (e.g., denial of service attacks, port scans or even attempts to crack into computers) by monitoring network traffic. Network intrusion detection systems read incoming packets of network data try to find suspicious patterns known as signatures or rules.

The domain agnostic hypothesis manager performs the following steps: deleteTracks (step 308), doReclustering (step 312), updateTrkFamilies (step 316), Maintain Track ICLs (step 320), mergeClusters (step 324), splitClusters (step 328), formHypothesis (step 332), pruneObservations (step 336).

deleteTracks (step 308) includes deleting the tracks that were pruned in a previous cycle. It takes track delete messages from the association engine and performs the necessary deletions so as to maintain consistency between the association engine and the track hypothesis model of the domain agnostic hypothesis manager. In one embodiment, the step includes first sorting the tracks to be deleted by ID and sorting the active tracks in the system by ID. This facilitates comparing them. If the current ID in each sorted list is the same, delete that track from the track hypothesis model and advance both pointers. If the current ID in the tracks to be deleted is lower, then advance the pointer to the next track to be deleted. If the current ID in the active system tracks list is lower, advance the pointer to the active system tracks. This is repeated until one of the lists is empty.

doReclustering (step 312) includes reforming clusters that have had some activity since the last association cycle (e.g., at least one track in the cluster was deleted). This function re-forms clusters which have had at least one track deleted from them while processing the previous set of observations. It is not possible for clusters to have merged since the last cluster updated, as tracks must be added in order for clusters to merge. Cluster merging is described below. Reclustering prevents clusters from getting too large, and also aids accurate hypothesis formation. Keeping the cluster size small also aids significantly in reducing the search time during hypothesis formation, helping to keep the tracking process running in real time without sacrificing solution quality.

In one embodiment, doReclustering (step 312) includes taking the first family in the old cluster and start a new cluster with this family (and its tracks). Then using the incompatibility list of each track T in that family, add all of the families of those tracks which are on T's incompatibility list to the new cluster. In doing so, the system maintains a list of the tracks that have been taken or "used" from the old cluster which is being reclustered. The step also includes adding "unused" or not "used" tracks/families from the old cluster until no more tracks/families can be added. Then, recursively go through all of those family's tracks' incompatibility lists which have been added to the new cluster until no more families/tracks can be found that have not been "used". At this time the new cluster has been completely populated by all possible interacting families. Then, get the first family/track that has not been "used" and repeat the function defined above until all of the families/tracks in the old cluster have been "used." After the functions described above are finished for the old cluster, then the next cluster eligible for reclustering is reclustered using the same method. This continues until all of the eligible clusters have been reclustered.

updateTrkFamilies (step 316) includes starting new tracks, and forming branch tracks on preexisting tracks based on the information received from the association engines.

Maintain Track ICLs (step 320) includes updating all of the tracks' incompatibility lists after all data association is done. This step updates all of the track incompatibility lists, which will change due to more tracks now interacting with each other (sharing observations) because of the data association function (gating/forming branch tracks) described above. In one embodiment, the step includes taking all of the tracks, which shared the same observation, and saving in the track hypothesis model the fact that they are incompatible. It is not necessary to save incompatibility information for tracks that are in the same family, since by definition all tracks within a family are incompatible with each other.

mergeClusters (step 324) includes (after initiating new tracks, and forming branch tracks) merging clusters. Cluster merging comprises combining clusters that share an observation. In some embodiments, the step includes iterating over the list of tracks formed from each of the current observations and merging the clusters if they are different.

splitClusters (step 328) includes limiting the number of tracks allowed in a cluster to limit hypothesis formation processing time which scales as the square of the number of tracks. This step educes the number of tracks in a cluster if the pre-specified maximum number of tracks in a cluster is exceeded. The maximum number of tracks in a cluster may be specified by, for example, a user. In one embodiment, the following steps are followed to reduce the number of tracks in the cluster: 1. Sort tracks in cluster in ascending order by some estimate of the track probability. For instance one could use the track probability of the parent track times the exponential of the difference of the parent track score and child track score to compute an estimate of the track probability. 2. Conditionally delete tracks until number is below the pre-specified maximum, 3. Recluster the cluster, 4. Restore conditionally deleted tracks which do not force a cluster merge, 5. delete the remaining conditionally deleted tracks.

formHypotheses (step 332) includes grouping compatible tracks into hypotheses, finding the best hypothesis (highest score), and assigning probabilities to tracks from the hypotheses in which the tracks are contained. Compatible tracks are tracks that are non-interacting (i.e., tracks that do not share observations). Hypothesis formation is a search. The root of the hypothesis tree is the empty hypothesis, which contains no tracks. Given a hypothesis node (a hypothesis is a set of tracks that are compatible), the allowed branches from this node are formed by adding each track that is compatible with every track in the node hypothesis. The score of a hypothesis is the sum of the scores of each track that make up the hypothesis. The following are exemplary methods for hypothesis formation successfully used in a kinematic tracking application.

In one embodiment, a breadth first search approach was used. The breadth first hypothesis formation technique first forms all of the one track hypotheses and then continues on with 2 track hypotheses, then three track hypotheses, etc. Hypotheses are only formed from tracks with positive scores during this portion of the search, as negatively scored tracks will not contribute toward finding the best hypothesis. Tracks with negative scores will be considered after the first search is complete. This is different from the depth-first approach which traverses each hypothesis to its end node using score heuristics to make correct decisions at nodes. The reason why the breadth-first approach has been chosen for this application is for run time efficiency reasons. The run time of the hypothesis tree depth-first approach goes up exponentially. When the hypothesis tree is more than 7 levels deep (it is possible to have 20 or more levels in an exemplary tree) this approach is impractical for real time operations because of the computational burden.

The following describes the operations performed in hypothesis formation: 1. sort all positively scored tracks in the cluster in descending order of their scores; 2. build the incompatibility matrix for the portion of the cluster consisting of positively scored tracks—"n"×"n" matrix—"n" is number of tracks with positive score in the cluster; 3. if only one family exists in the cluster, the best hypothesis is the highest score track in the family and the track probability is calculated directly using EQNS. (8) and (9) below; and 4. if more than one family is in the cluster, then the following steps are performed:

a) Form "n" one track hypotheses and compute the compatibility list for each hypothesis, in accordance with:

$$H_{ci}=Tc_i \cap [T_{i+1}, \ldots T_n] \qquad \text{EQN. 2}$$

where: $H_{ci}$ is the set of compatible tracks for hypothesis i, $Tc_i$ is track i's compatibility list for all tracks in the cluster, $[T_{i+1}, \ldots T_n]$ is tracks i+1 through n, where n is the number of tracks in the cluster. Only tracks with lower scores than track i's score are added to the compatibility list. This ensures that there will be no duplicate hypotheses.

Next, b) the potential score for each 1 track hypothesis is calculated in accordance with:

$$PL_i = CL_i + LTc_1 \qquad \text{EQN. 3}$$

where $PL_i$ is the potential score for hypothesis i, $CL_i$ is the current score for hypothesis i, and $LTc_1$ is the score of the first compatible track for hypothesis i.

Next, hypotheses with 2 or more ("m") tracks are formed by the following steps d) through i). Step d) includes finding a pre-specified number of hypotheses which pass a threshold defined in EQN. 4 and have at least one track on their compatibility list in accordance with:

$$TH_{CL}=CL_{max}+\Delta CL \qquad \text{EQN. 4}$$

where $TH_{CL}$ is the current score hypothesis threshold score, $CL_{max}$ is the current maximum hypothesis score, and $\Delta CL$ is the current delta score threshold.

Next, step e) includes determining if fewer than a predetermined number of hypotheses are selected for expansion based on the current score, then the top score hypotheses that did not pass the expansion minimum threshold test defined above in EQN. 4, but that did have at least one track on their compatibility list are added to that expansion list to assure at least a pre-specified number of hypotheses are expanded.

Next, step f) includes finding the top pre-specified number of hypotheses that pass a threshold defined in EQN. 5 and have at least one track on their compatibility list in accordance with:

$$TH_{PL}=PL_{max}+\Delta PL \qquad \text{EQN. 5}$$

where $TH_{PL}$ is the potential score hypothesis threshold score, $PL_{max}$ is the potential maximum hypothesis score, and $\Delta PL$ is the potential delta score threshold.

Next, step g) includes forming new "m" track hypotheses from the "m-1" track hypothesis by adding a track from the "m-1" hypothesis' compatibility list. The number of tracks chosen to be expanded into new hypotheses is defined in accordance with:

$$N_{CT}=\min(H_{CLi},\text{max\_off}) \qquad \text{EQN. 6}$$

where, $N_{CT}$ is the number of tracks to use in the expansion of a hypothesis, $H_{CLi}$ is the number of tracks on the compatibility list of hypothesis i, and max_off is a pre-specified number of expansions. Each hypothesis chosen in steps d) and f) above is expanded into the number of hypotheses defined in EQN. 6 above by adding a track to that hypothesis from its own compatibility list and forming a new "m" track hypothesis.

Next, step h) includes determining the compatibility list for each new hypothesis in accordance with:

$$H_{ci}=Tc_i \cap H_{cpar} \qquad \text{EQN. 7}$$

where, $H_{ci}$ is the set of compatible tracks for hypothesis i, $Tc_i$ is track i's compatibility list, and $H_{cpar}$ is the parent hypothesis' ("m-1" track hypothesis) compatibility list.

Next, step i) includes computing the potential score for each new hypothesis in accordance with EQN. 3 and then step j) includes repeating steps d) through i) until there are no more hypotheses to expand (i.e., the compatibility lists are empty). The system then saves the best hypothesis which is the hypothesis with the best score.

Next, tracks with negative scores are considered. Continue steps d) through i) in step 4 with only negatively scored tracks. At this point only hypothesis scores within a pre-specified distance from the score of the best hypothesis will be saved. This is because hypothesis scores below this value do not contribute appreciably to the track probability. Track probabilities are calculated by calculating and summing the probability of each hypothesis in which the track appears in accordance with EQNS. 8 and 9:

$$TOT_{HL} = \sum_{i=1}^{M} e^{CL_i} \qquad \text{EQN. 8}$$

where $TOT_{HL}$ is the total likelihood for all hypotheses, M is the total number of hypotheses, and $CL_i$ is the current score of hypothesis i, and $$PH_i = \frac{e^{CL_i}}{1.0 + TOT_{HL}} \qquad \text{EQN. 9}$$

where $PH_i$ is the probability of hypothesis i, $CL_i$ is the current score of hypothesis i, and $TOT_{HL}$ is defined above in EQN. 7

Referring to FIG. 3, pruneObservations (step 336) includes removing tracks in the system by performing N-association pruning to reduce the number of active tracks. This step establishes a new progenitor or starting node for a set of tracks in a family. In addition, tracks in a family not in the best hypothesis are considered for deletion. In one embodiment, pruneObservations (step 336) performs the following steps: 1) determine for each family in the cluster if it has a track in the best hypothesis or not; 2) tracks are deleted if: I. It's a confirmed track, II. AND it has at least a pre-specified number of observations, III. AND its family has no track in the best hypothesis, IV. AND it does not share observations with the best hypothesis track; 3) for each family that has a track in the best hypothesis the following steps are performed: A) determine if the track in the best hypothesis has associated with at least a pre-specified number of observations; B) if the track meets the criteria in 3A above, then the new progenitor or root node is found by finding the observation in the past (counting the last associated observation as the first observation) is associated with the track in the best hypothesis; C) then, all tracks are saved in the family that were associated with any of the last n associations in the best tracks history list at that time; and D) all the rest of the tracks in the family that did not pass the test in C) are deleted.

The domain agnostic hypothesis manager sends the probability estimates for each of the updated tracks to the association engine (step 372). The association engine then determines which of the tracks are associated with the best estimate (step 376). The association engine then prunes (step 380) those tracks that were pruned from the track hypothesis model. The association engine then filters tracks (step 384). Filtering is the process wherein a refined state estimate is computed using all the measured observation data in the track. An example of filtering for the kinematic domain is to utilize a Kalman-Schmidt filter. Some domains, such as cyber, do not yet have an equivalently identified process currently. The association engine then deletes the tracks that were pruned (step 392). The association engine then sends the updated track information to the entity collector module (step 392).

Figure 4A:
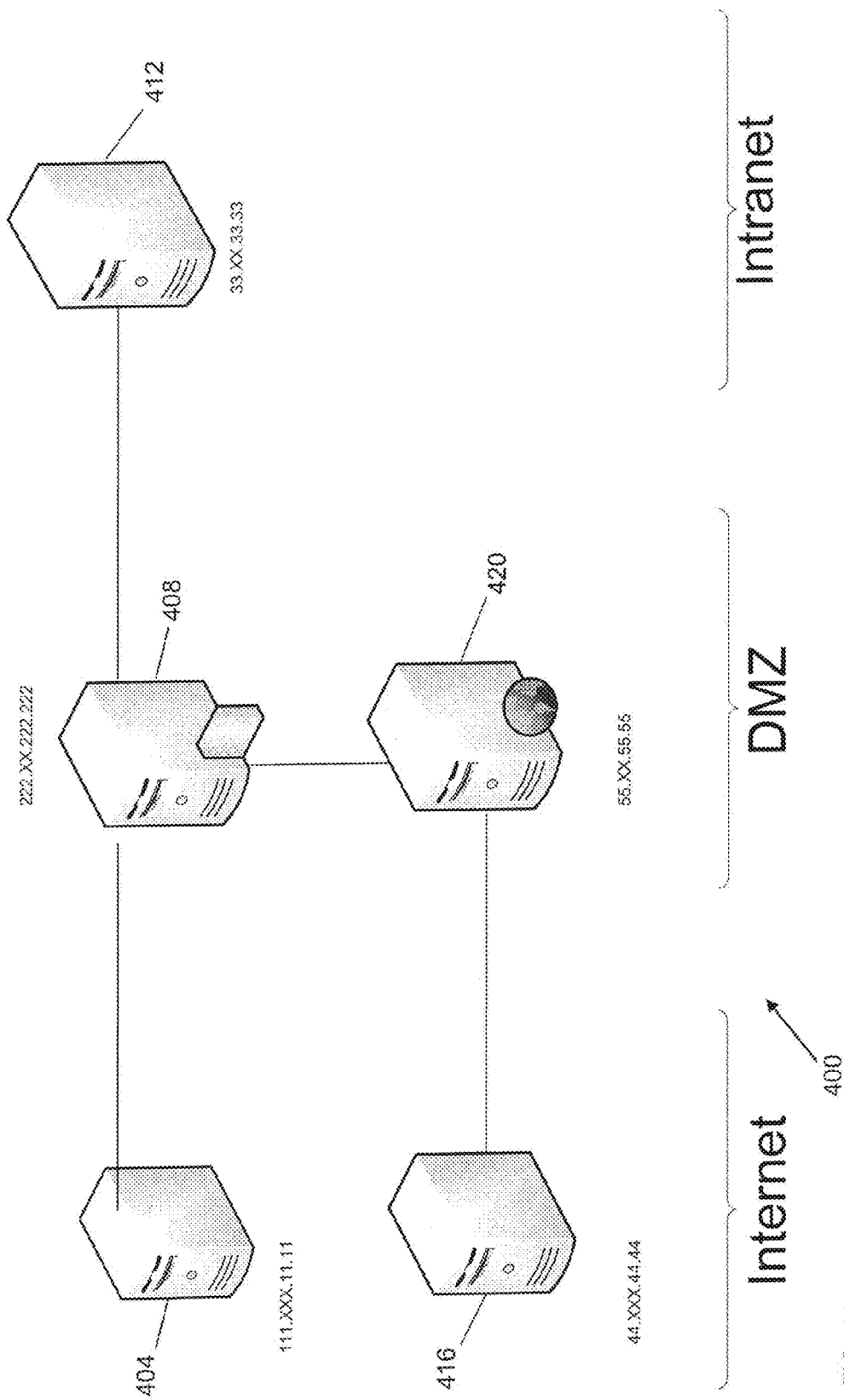
FIGS. 4A-4E are schematic illustrations applying multiple hypothesis tracking to a cyber security application, according to an illustrative embodiment.

FIGS. 4A through 4E are schematic illustrations applying multiple hypothesis tracking to a simulated cyber security application in a computer network 400, according to an illustrative embodiment. Referring to FIG. 4A, the network 400 includes five computers 404, 408, 412, 416 and 420, each having a unique IP address. Computers 404 and 416 are computers accessing the network 400 via an internet connection. Computer 408 is a computer functioning as the firewall for a company trying to manage the cyber security of the company computer resources. Computer 420 is a computer functioning as the company's web server and is attached to the company's demilitarized zone (DMZ). Computer 412 is a computer located within the firewall of the company.

Figure 4B:
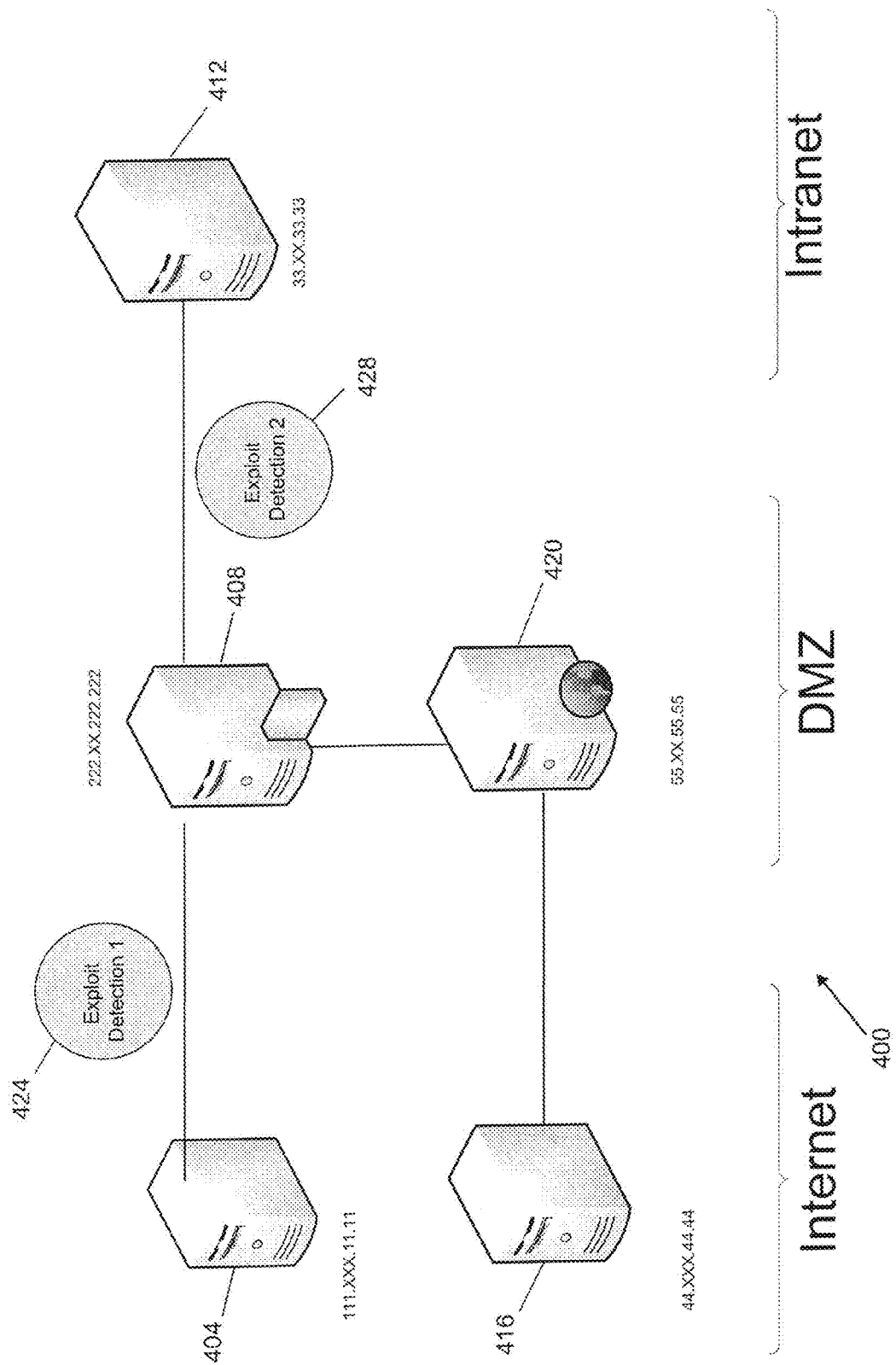

The domain agnostic multiple hypothesis tracking methods described herein were applied to the simulation. FIG. 4B illustrates two observations 424, 428 received by an observation distributor module (e.g., observation distributor module 108 of FIG. 1). Network data is provided to a cyber sensor (for example, an intrusion detection system (e.g., a Snort intrusion prevention system—an open source network intrusion system)). The cyber sensor identifies the two observations 424 and 428, which the cyber sensor provides to the observation distributor module. In this simulation, the observations represent an exploitation of the target machine 408 (e.g., taking advantage of a vulnerability system to gain access to a processor). In this example, the observations 424 and 428 have an intrusion signature of "MS-SQL Worm propagation attempt" from computer 404 to computer 408 and computer 412 to computer 408; respectively. The two observations are sent to an association engine (e.g., association engine 120 of FIG. 1). The association engine may, for example, designate the observations as corresponding to two separate tracks as well as a track that includes both observations.

Figure 4C:
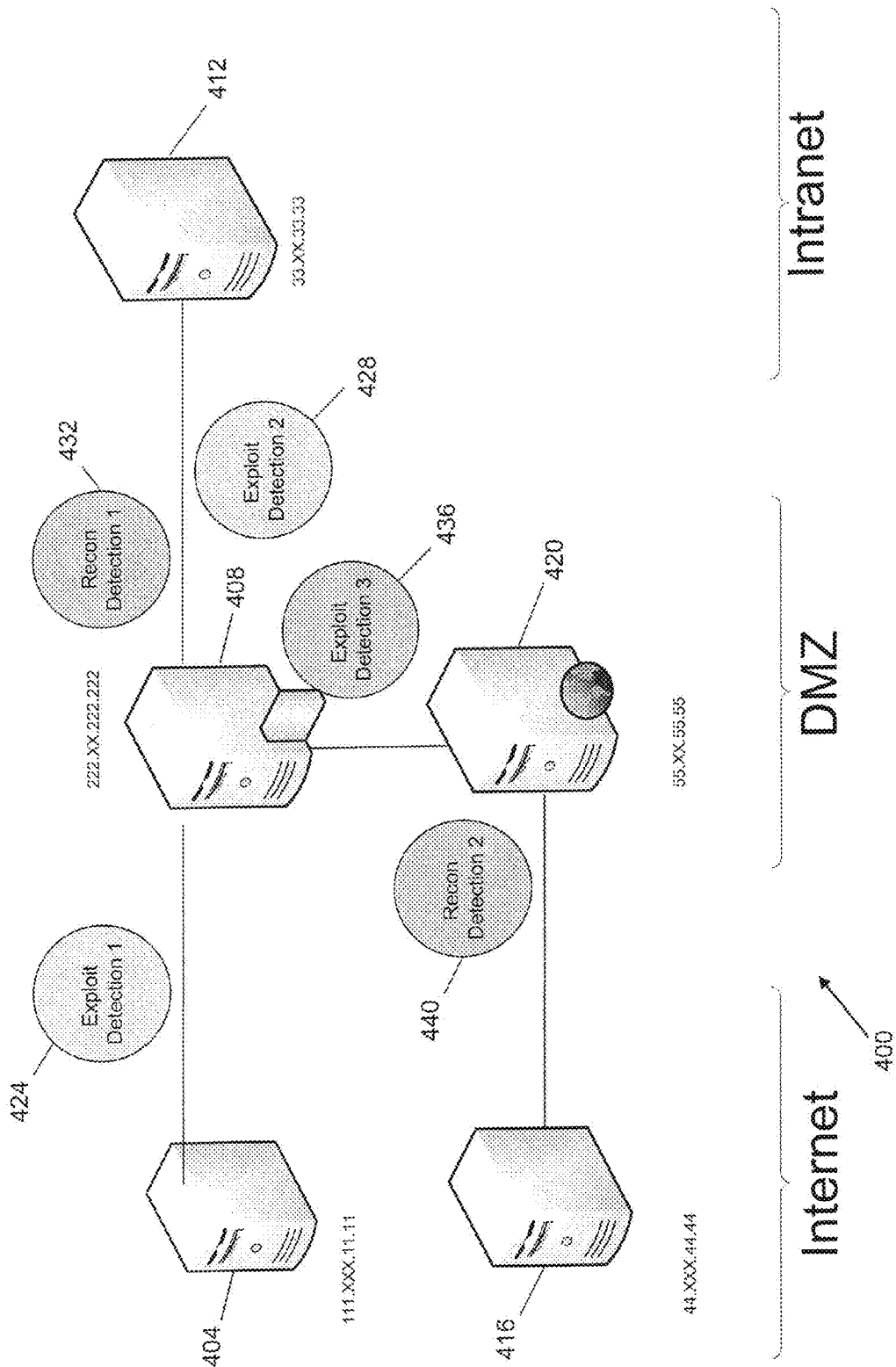
Figure 4D:
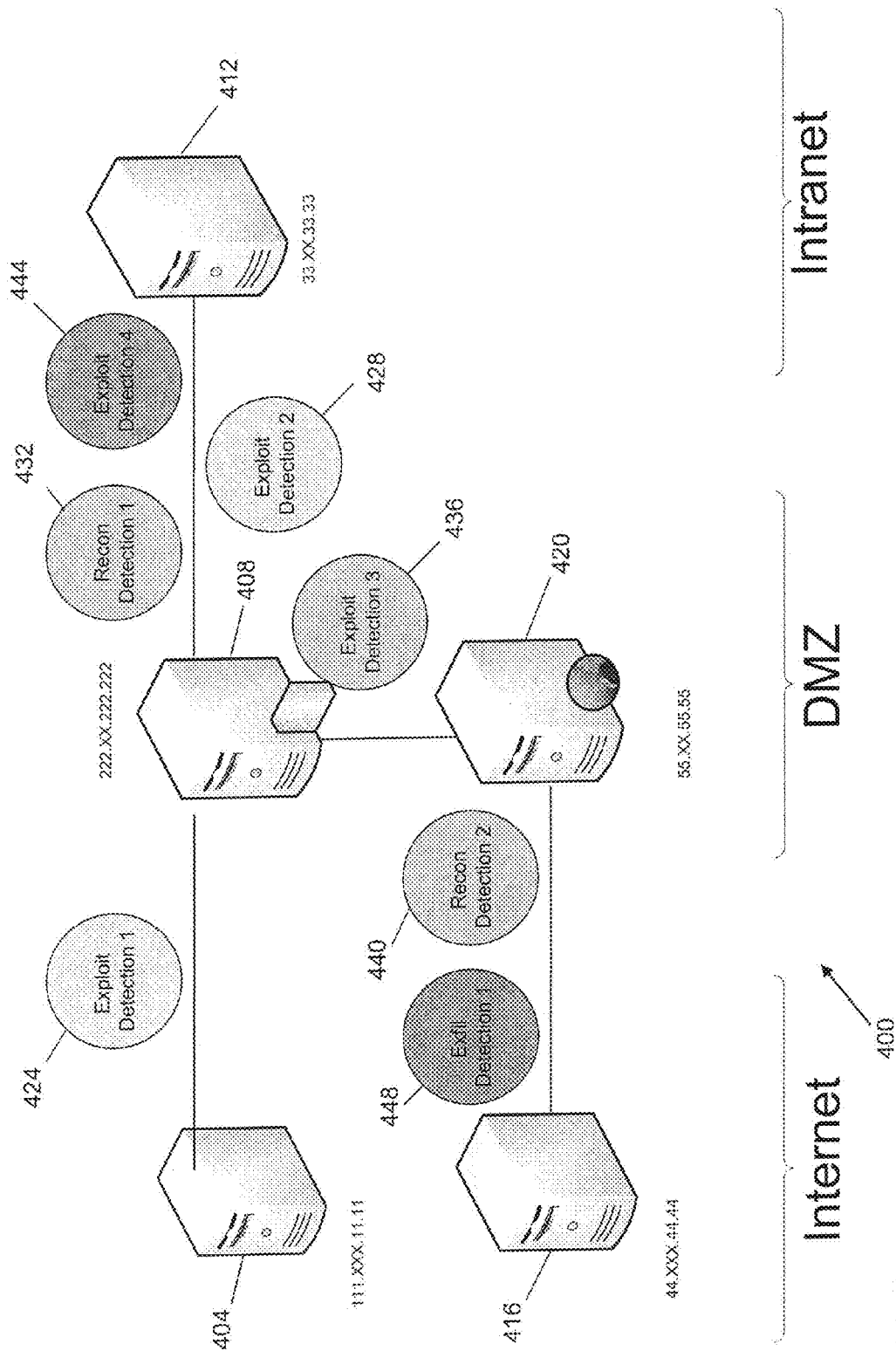

FIG. 4C illustrates three new observations 432, 436, and 440 received by the observation distributor module. Observation 432 represents a reconnaissance from computer 408 to computer 412 to identify potential access into the network. In this example, observation 432 has the signature "SCAN nmap TCP." Observation 436 represents an exploitation with a signature of "WEB-ATTACKS rm command attempt" of computer 420 from computer 408. Observation 440 represents a reconnaissance from computer 416 to computer 420 and in this example has a signature of "ICMP Timestamp Request." The association engine now associates the new observations 432, 436, and 440 with the preexisting tracks and/or new tracks generated by the association engine in accordance with the methods described herein. FIG. 4D illustrates two new observations 444 and 448 received by the observation distributor module. Observation 444 represents an exploitation of computer 412 from computer 408 detected with a signature "NETBIOS SMB-DS mqqm QMDeleteObject WriteAndX unicode little endian overflow attempt." Observation 448 represents an exfiltration (or stealing) of data from computer 420 to computer 416 and is detected with a signature of "ATTACK-RESPONSES index of /cgi-bin/response." The association engine now associates the new observations 444 and 448 with the preexisting tracks and/or new tracks generated by the association engine in accordance with the methods described herein.

Figure 4E:
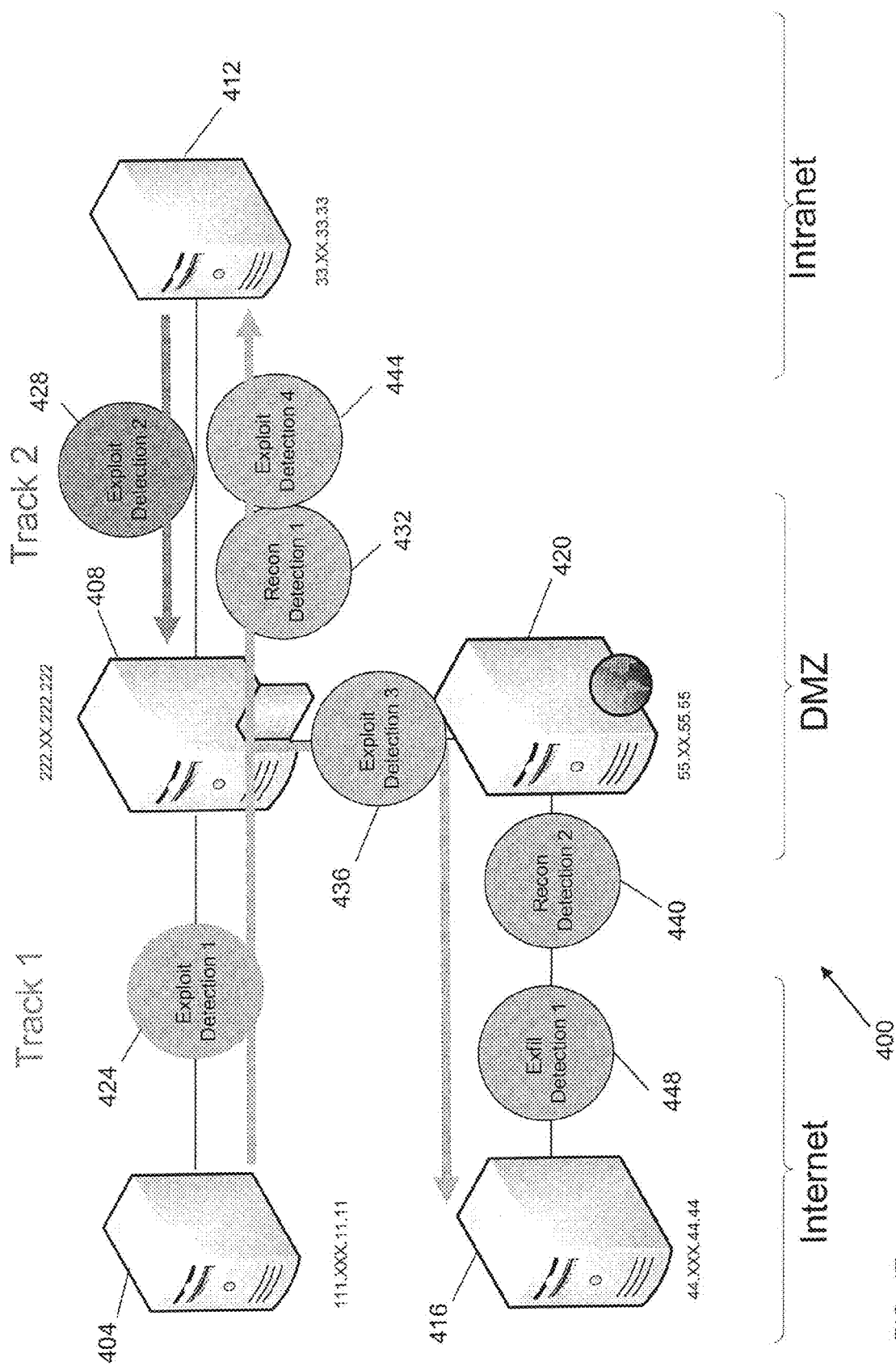

Referring to FIG. 4E, in this simulation, implementation of the domain agnostic multiple hypothesis tracking method resulted in the system determining observation 432 is associated with a reportable track having a single observation (e.g., a reportable track may, for example, be one that may be reported to an end user by, for example, the entity collector 112 of FIG. 1). The system also determined the other observations (424, 428, 436, 440, 444, and 448) are associated with a second reportable track. In this interpretation of the sensor data, Track 1 represents a coordinated, multi-party, external exfiltration of data where the attacker at machine 404 breaks into the computer network 400 to steal and post data on the webserver 420 which is then collected by the attacker on computer 416. Further, Track 2 represents the identification of an insider threat.

Figure 5A:
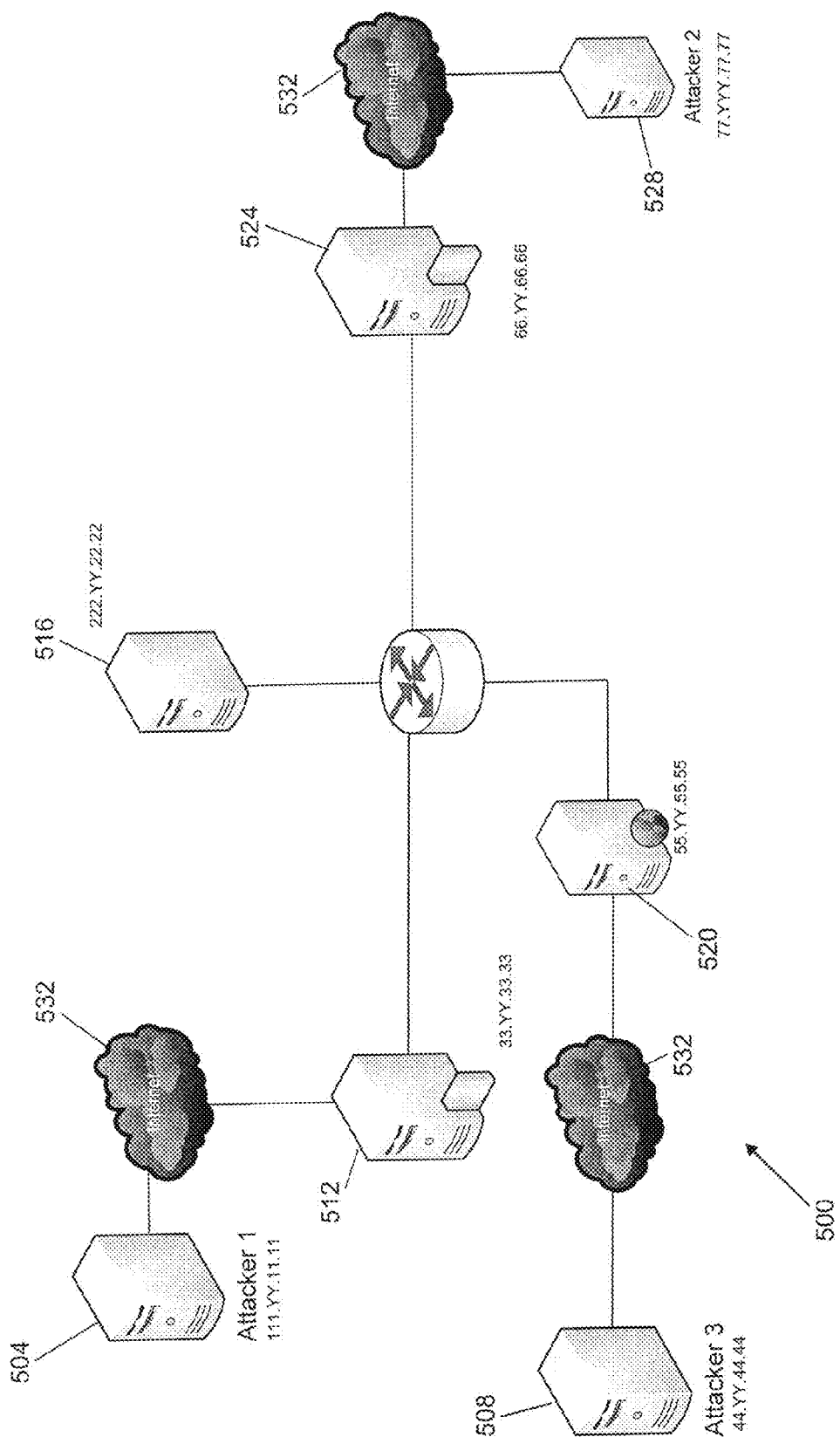
FIGS. 5A-5G are schematic illustrations applying multiple hypothesis tracking to a cyber security application, according to an illustrative embodiment.

FIGS. 5A-5G are schematic illustrations applying multiple hypothesis tracking to a simulated cyber security application in a computer network 500, according to an illustrative embodiment. Referring to FIG. 5A, the network 500 includes seven computers 504, 508, 512, 516, 520, 524 and 528, each having a unique IP address. Computers 504, 508 and 528 are computers attacking a company computer network that includes computers 512, 516, 520 and 524 via internet connections 532.

Figure 5B:
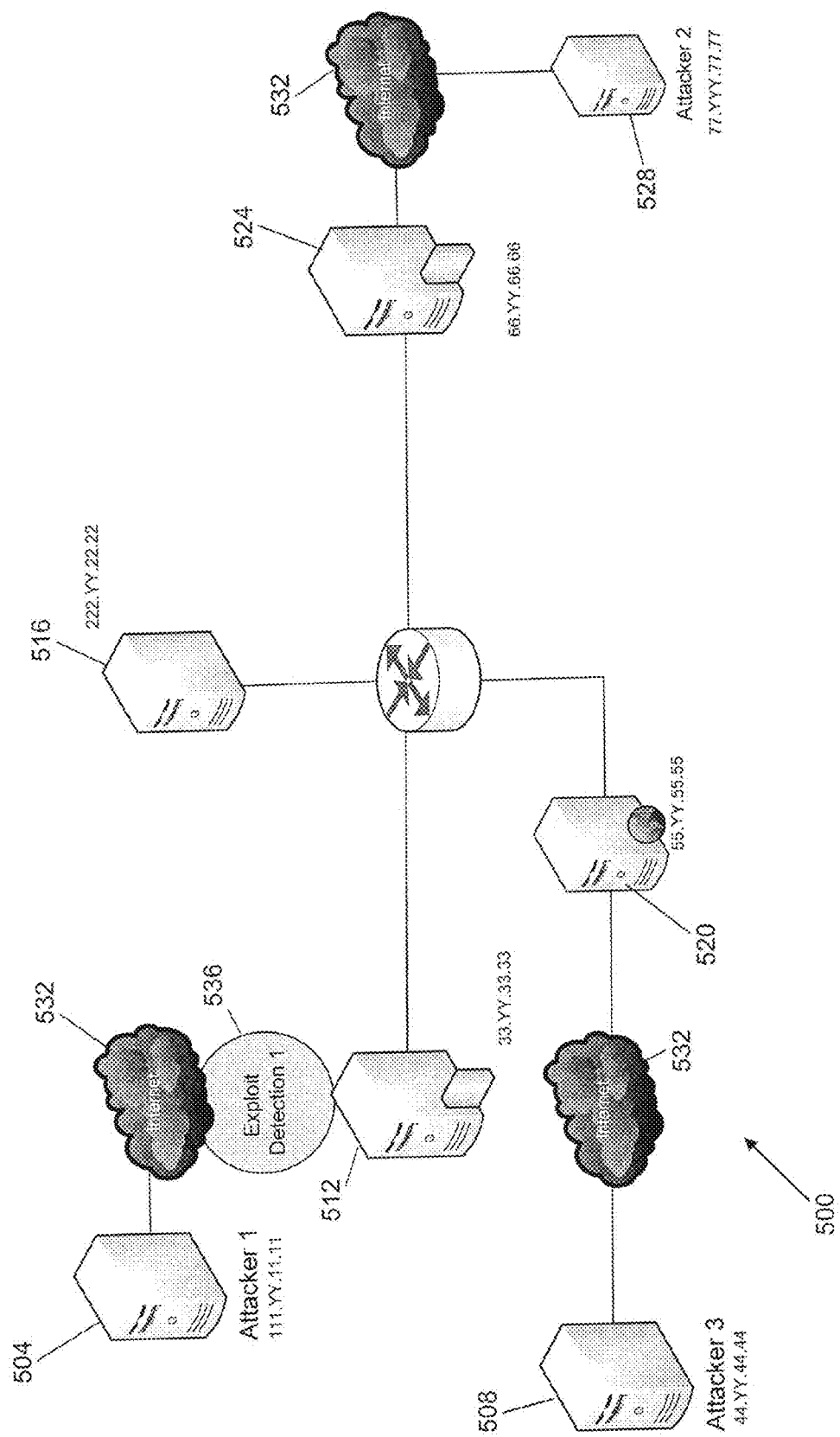

The domain agnostic multiple hypothesis tracking methods described herein were applied to the simulation. FIG. 5B illustrates an observation 536 received by an observation distributor module (e.g., observation distributor module 108 of FIG. 1). Observation 536 represents the sensing of an exploitation of computer 512 by computer 504 in the form of a snort intrusion detection with a signature of "MS-SQL Worm propagation attempt." The observation 536 is sent to an association engine (e.g., association engine 120 of FIG. 1). The association engine may, for example, designate the observation as belonging to one or more separate tracks.

Figure 5C:
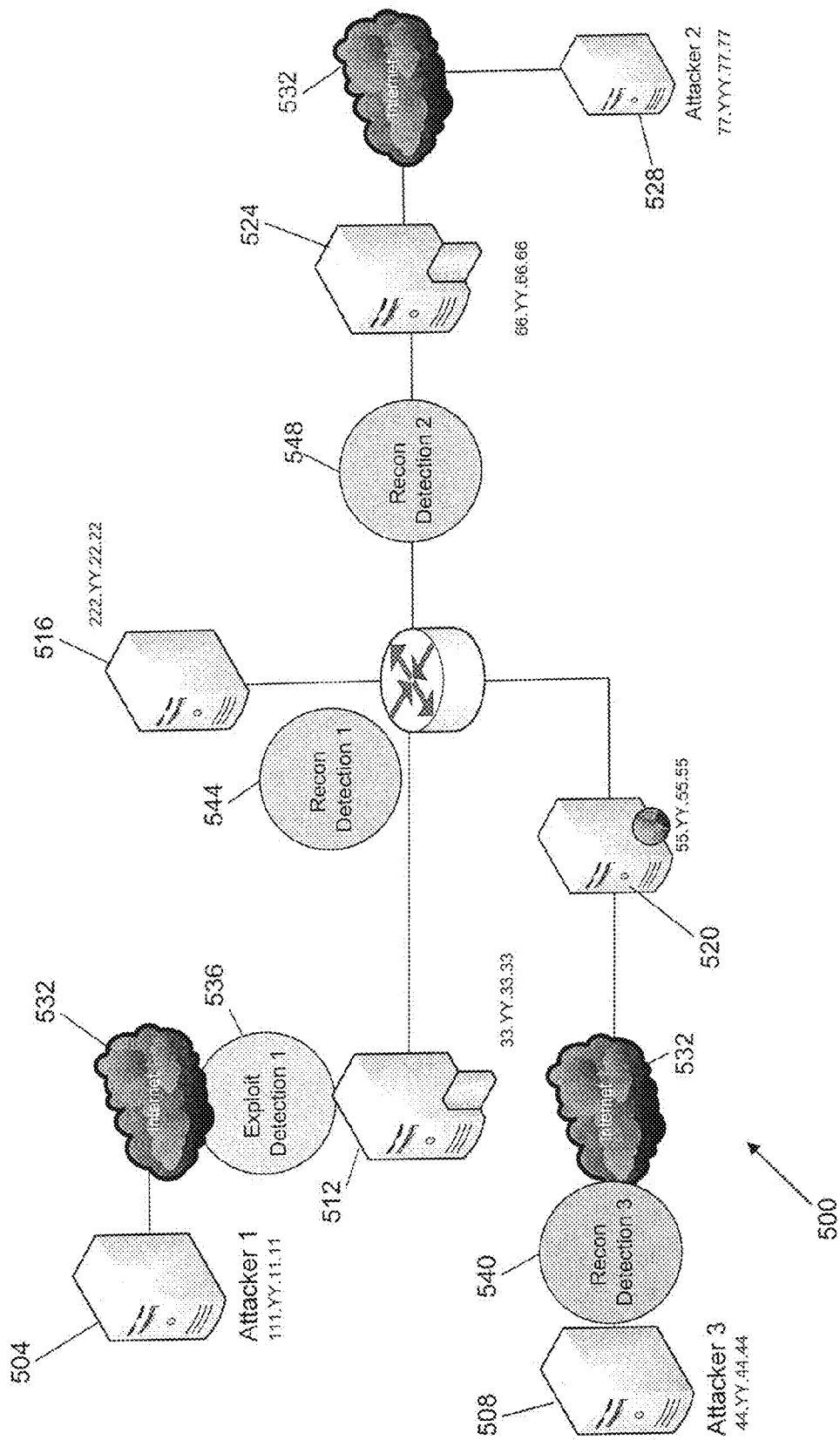
Figure 5D:
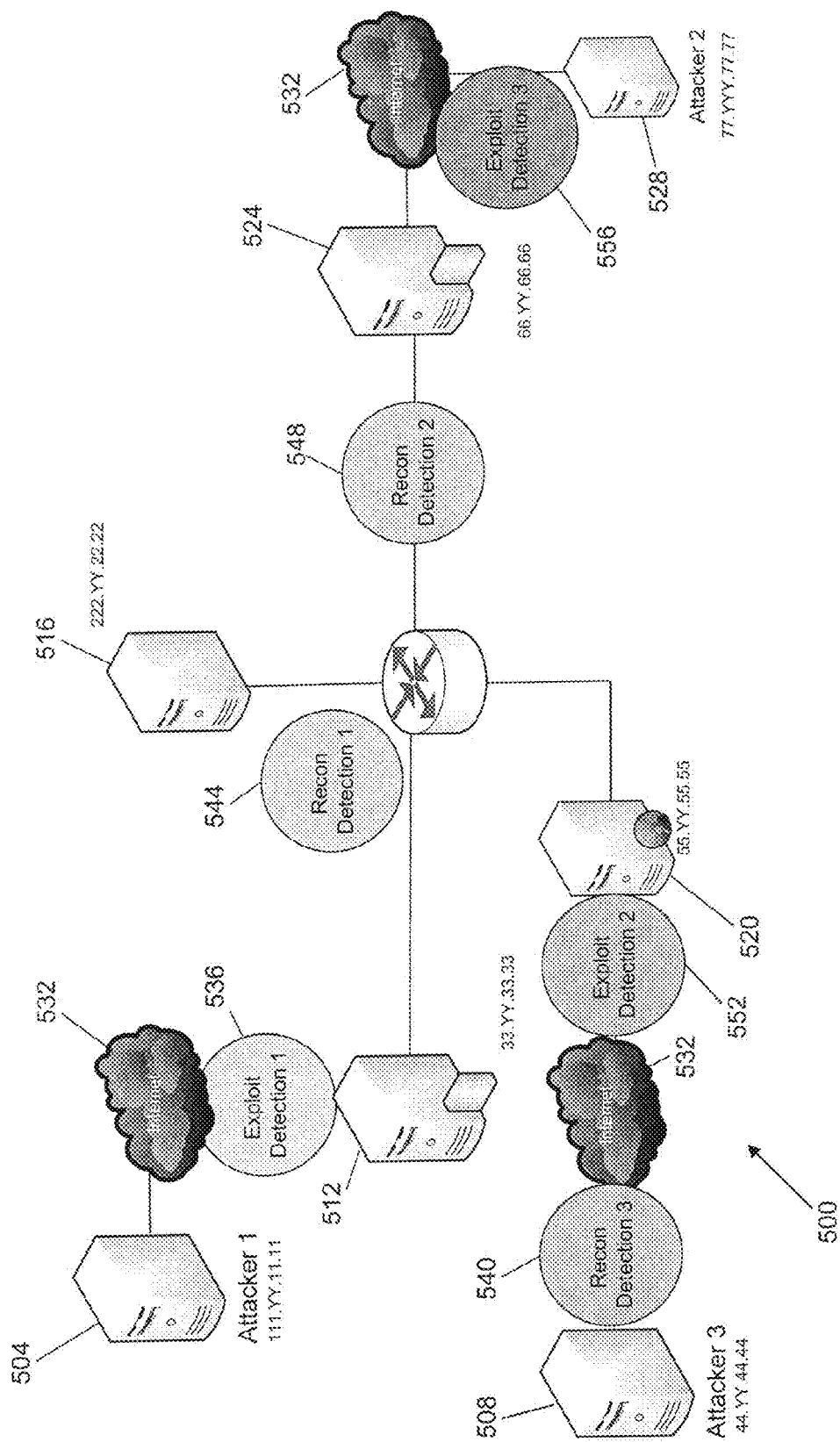

FIG. 5C illustrates three new observations 540, 544 and 548 received by the observation distributor module. Observation 540 represents a reconnaissance of computer 520 from computer 508 in the form of a snort detection with a signature of "SCAN nmap TCP." Observations 544 and 548 collectively represent fingerprinting activities of the internal network (computers 516 and 524; respectively) from computer 512 in the form of snort detections with a signature of "ICMP Traceroute." The association engine now associates the new observations 540, 544 and 548 with the preexisting tracks and/or new tracks generated by the association engine in accordance with the methods described herein. FIG. 5D illustrates two new observations 552 and 556 received by the observation distributor module. Attacker 1 has ceased its portion of the attack and via backchannels (for example, posting on a forum or emailing directly) has sent the results of its reconnaissance to Attacker 2. Observation 556 is the continuation of the attack and represents an exploitation of computer 524 which is detected via snort detection with a signature of "MS-SQL Worm propagation attempt." Attacker 3 (representing a hacktivist, or hacker activist), completes its website defacement attack with Observation 552; detected via snort detection with a signature of "WEB-ATTACKS rm command attempt." The association engine now associates the new observations 552 and 556 with the preexisting tracks and/or new tracks generated by the association engine in accordance with the methods described herein.

Figure 5E:
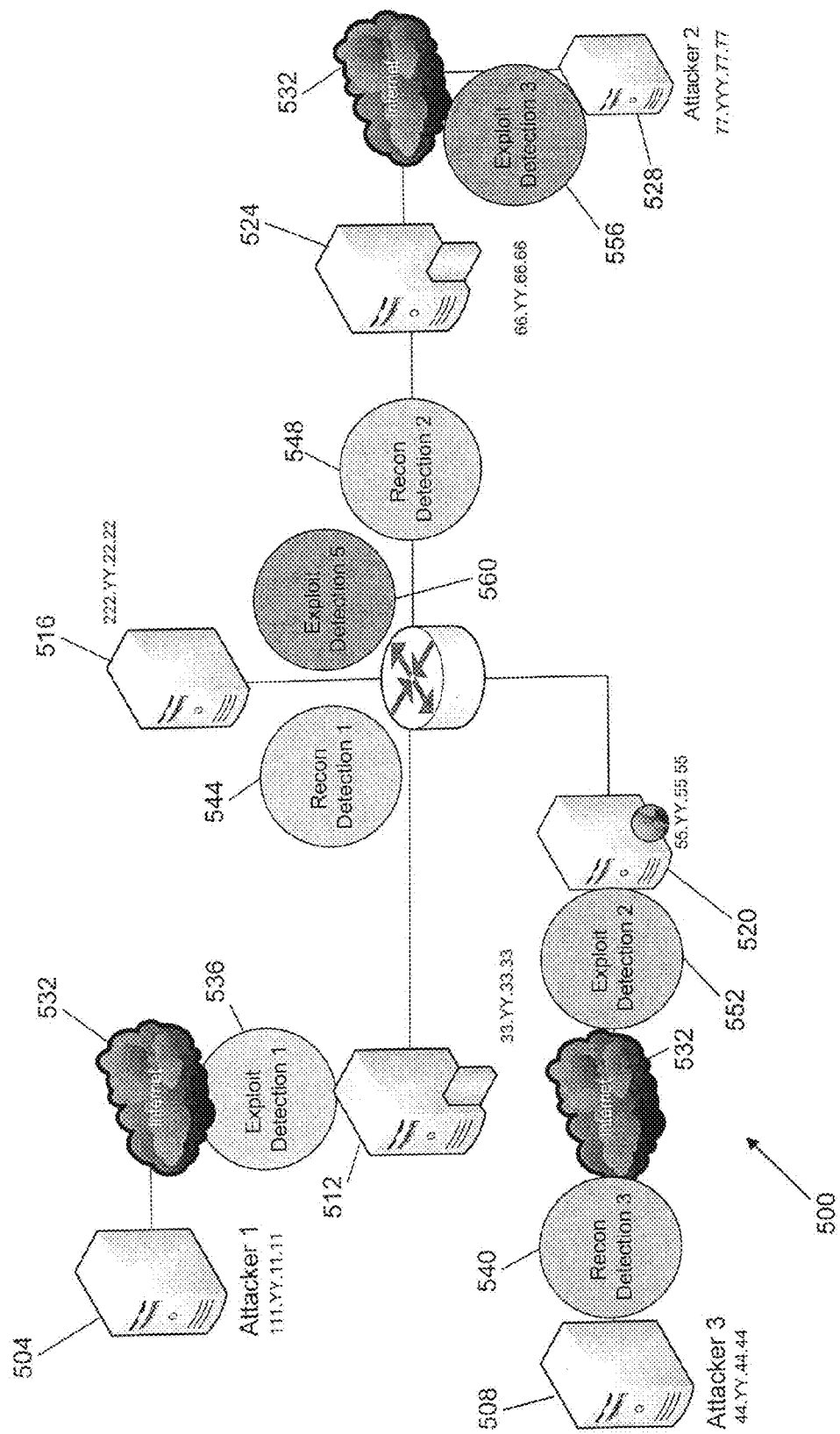
Figure 5F:
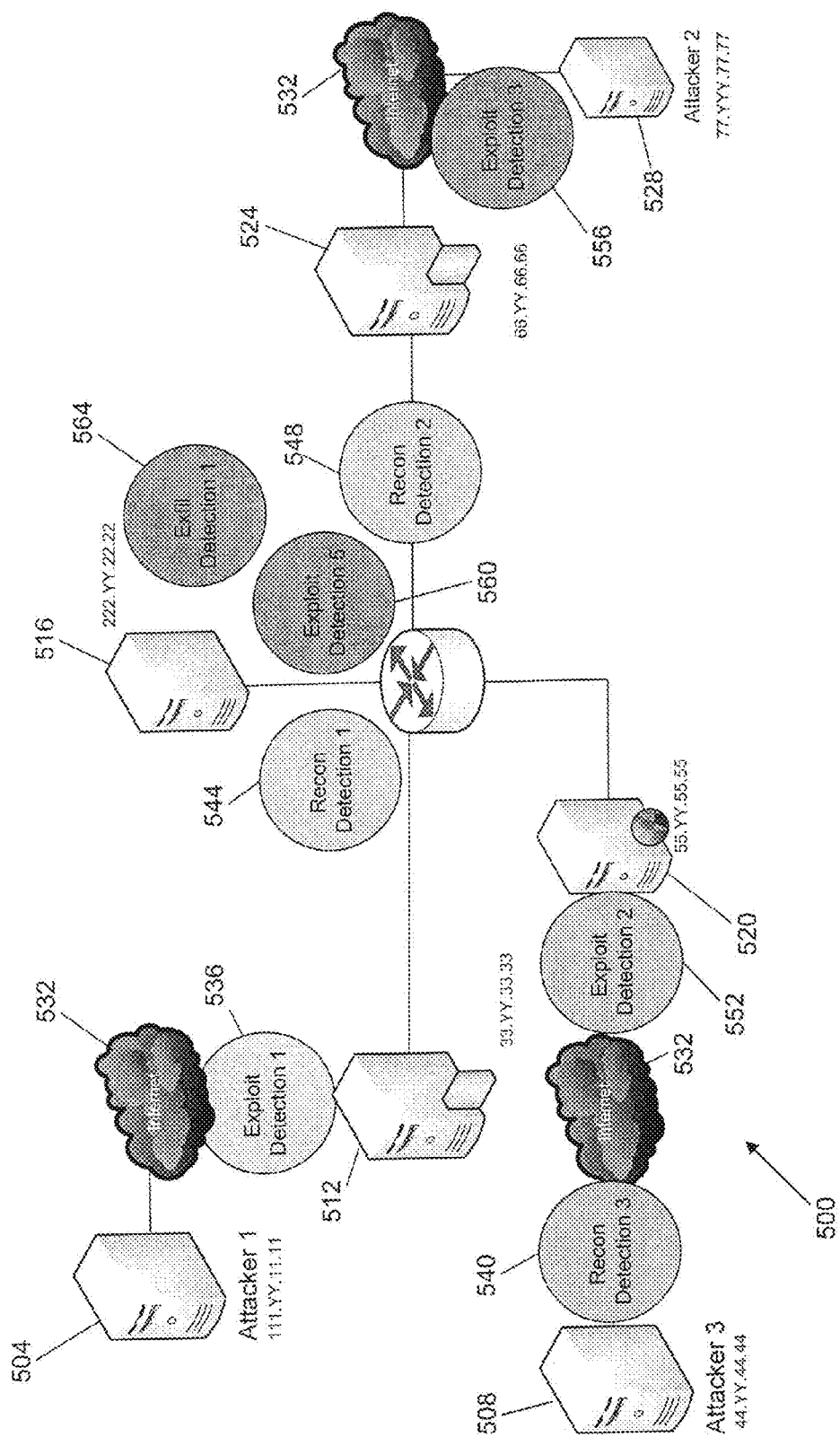

FIG. 5E illustrates one new observation 560 received by the observation distributor module. Observation 560 represents an exploitation of the internal workstation computer 516 and is detected using snort intrusion detection with a signature of "NETBIOS SMB-DS mqqm QMDeleteObject WriteAndX unicode little endian overflow attempt." The association engine now associates the new observation 560 with the preexisting tracks and/or new tracks generated by the association engine in accordance with the methods described herein. FIG. 5F illustrates one new observation 564 received by the observation distributor module. This observation 564 represents an exfiltration (or stealing) of data and is detected via snort intrusion detection with a signature of "FINGER 0 query." The association engine now associates the new observation 564 with the preexisting tracks and/or new tracks generated by the association engine in accordance with the methods described herein.

Figure 5G:
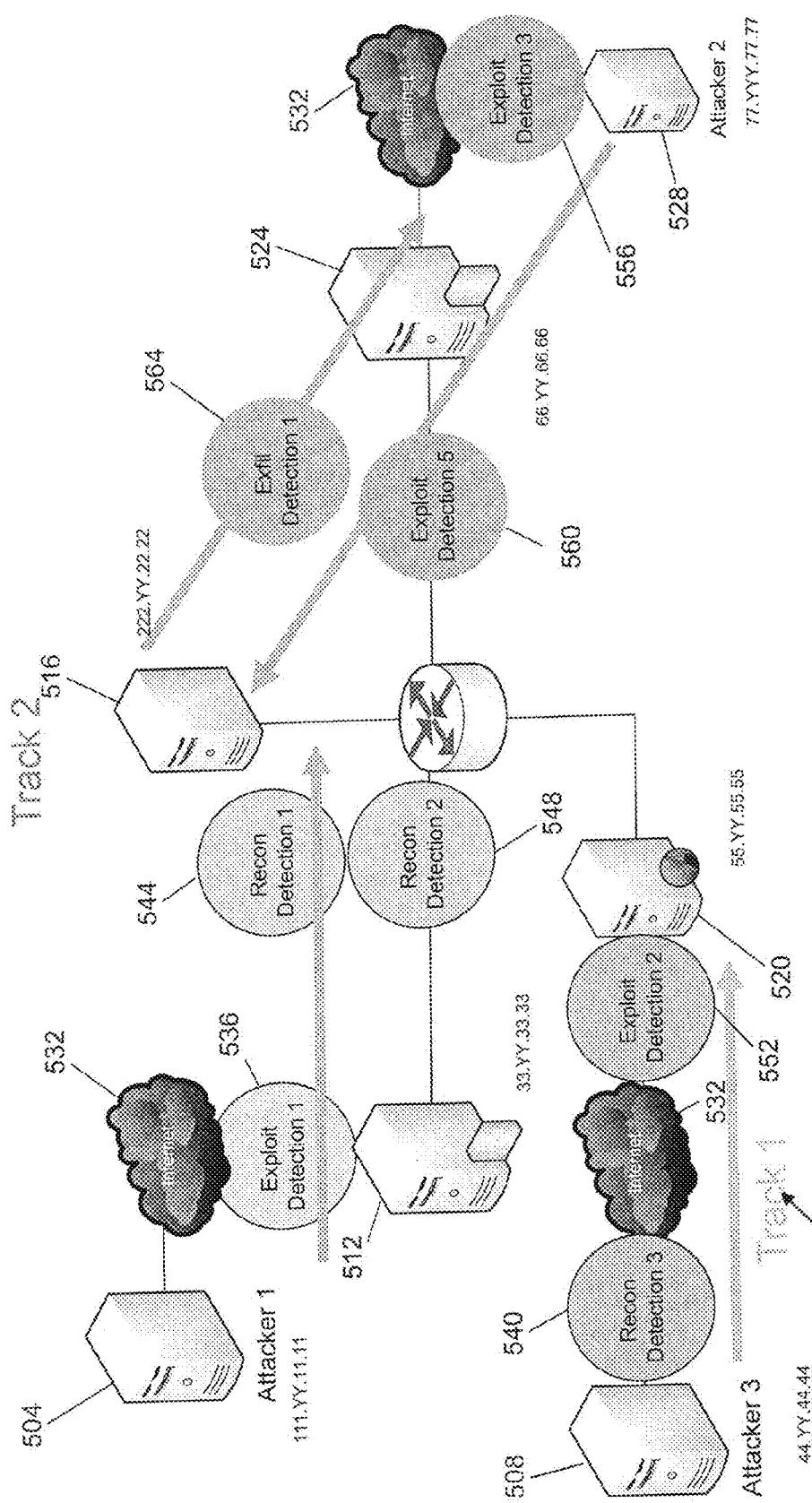

Referring to FIG. 5G, in this simulation, implementation of the domain agnostic multiple hypothesis tracking method resulted in the system determining observations 540 and 552 are associated with a reportable track (Track 1) configured for a single attacker (processor 508) to deface a website hosted by processor 520. The system also determined the other observations (536, 544, 548, 556, 560 and 564) are associated with a second reportable track (Track 2) configured for a multi-party attack by two attackers (processors 504 and 528) to attempt to exfiltrate data from the company's network (composed of processors 512, 516, 520 and 524).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A multiple hypothesis tracking method for tracking observations, the method comprising:
   receiving observations associated with data signals from a plurality of domain types;
   distributing each of the observations to one or more association engines, wherein each association engine is configured for a particular domain type and each association engine manages zero or more preexisting tracks of observations;
   associating each of the observations with a) the one or more preexisting tracks, or b) a newly generated track to generate an updated set of tracks;
   sending the updated set of tracks with track quality scores for each track to a domain agnostic hypothesis manager;
   updating a track hypothesis model of the domain agnostic hypothesis manager with the updated set of tracks;
   determining a probability estimate for each track in the track hypothesis model and selecting a hypothesis for each cluster of related tracks stored in the track hypothesis model that satisfies a predetermined cluster condition;
   sending the probability estimate for each track in the track hypothesis model and the selected hypothesis for each cluster of tracks to the one or more association engines to update track information in the one or more association engines; and
   sending the updated track information with domain specific information to an entity collector module for distribution to a recipient processor.

2. The method of claim 1, comprising selecting a subset of the tracks from the tracks in the selected hypothesis in the domain agnostic hypothesis manager that satisfy a predetermined criterion.

3. The method of claim 2, wherein selecting the subset of the tracks from the tracks in the domain agnostic hypothesis manager comprises selecting tracks from the hypothesis having the highest probability estimate based on observations from a plurality of domain types.

4. The method of claim 1, wherein the track hypothesis model does not include track state data that includes domain specific data.

5. The method of claim 1, wherein the association engines are not required to include track cluster information.

6. The method of claim 1, wherein updating the track hypothesis model comprises updating stored probability estimates and removing tracks that are inconsistent with the selected hypothesis for each cluster of tracks.

7. The method of claim 1, wherein updating track information in the one or more association engines comprises updating stored probability estimates and removing tracks that do not satisfy a predetermined criterion.

8. The method of claim 1, wherein a message handling system communicates messages between the domain agnostic hypothesis manager and the one or more association engines in the absence of domain specific data.

9. A multiple hypothesis tracking system for tracking observations, the system comprising:
   an observation distributor module configured to receive observations associated with data signals from a plurality of domain types;
   one or more association engines each configured for a particular domain type and each comprising zero or more preexisting tracks of observations stored in a data storage device, wherein each of the one or more association engines is configured to receive each of the observations from the observation distributor module and configured to associate each of the observations with a) the one or more preexisting tracks of observations, or b) one or more newly generated tracks to generate an updated set of tracks with track quality scores for each track; and a domain agnostic hypothesis manager for, via a processor of the system, receiving the updated set of tracks, updating a track hypothesis model of the domain agnostic hypothesis manager with the updated set of tracks, determining a probability estimate for each track in the track hypothesis model, selecting a hypothesis for each cluster of related tracks stored in the track hypothesis model that satisfies a predetermined cluster condition, and sending the probability estimate for each track in the track hypothesis model and the selected hypothesis for each cluster of tracks to the one or more association engines to update track information in the one or more association engines.

10. The system of claim 9, comprising an entity collector module configured to receive the updated track information with domain specific information for distribution to a recipient processor.

11. The system of claim 9, comprising a message handling system configured to communicate messages between the domain agnostic hypothesis manager and the one or more association engines in the absence of domain specific data.

12. The system of claim 9, wherein the processor selects a subset of the tracks from the tracks in the domain agnostic hypothesis manager that satisfy a predetermined criterion.

13. The system of claim 12, wherein selecting the subset of the tracks from the tracks in the domain agnostic hypothesis manager comprises the processor selecting tracks from the hypothesis having the highest probability estimate based on observations from a plurality of domain types.

14. The system of claim 9, wherein the track hypothesis model does not include track state data that includes domain specific data.

15. The system of claim 9, wherein the one or more association engines are not required to include track cluster information.

16. The system of claim 9, wherein the domain agnostic hypothesis manager is configured to update the track hypothesis model, update stored probability estimates and remove tracks that are inconsistent with the selected hypothesis for each cluster of tracks.

17. The system of claim 9, wherein the one or more association engines are configured to update stored probability estimates and remove tracks that do not satisfy a predetermined criterion.

* * * * *